United States Patent

Noda et al.

[11] Patent Number: 6,139,275
[45] Date of Patent: Oct. 31, 2000

[54] IMPELLER FOR USE IN COOLING DYNAMOELECTRIC MACHINE

[75] Inventors: Shinichi Noda; Nobutake Aikura, both of Mie; Takuro Hayashi, Kanagawa, all of Japan

[73] Assignee: Kabushiki Kaisha Toshiba, Kanagawa, Japan

[21] Appl. No.: 09/359,787

[22] Filed: Jul. 23, 1999

[30] Foreign Application Priority Data

Jul. 28, 1998 [JP] Japan .................................. 10-212937

[51] Int. Cl.$^7$ ...................................... F04D 29/66
[52] U.S. Cl. .......................... 416/203; 415/119; 417/366
[58] Field of Search ............. 415/119; 416/175, 416/185, 203, 223 B, 500; 417/366, 368, 423.8

[56] References Cited

U.S. PATENT DOCUMENTS 4,253,800  3/1981  Segawa et al. .................... 416/203
5,266,007  11/1993  Bushnell et al. .................... 416/203

FOREIGN PATENT DOCUMENTS 56-85594  7/1981  Japan ..................................... 416/203

*Primary Examiner*—Edward K. Look
*Assistant Examiner*—Liam McDowell
*Attorney, Agent, or Firm*—Limbach & Limbach, LLP

[57] ABSTRACT

An impeller used for cooling a dynamoelectric machine such as electric motors includes a disk and a plurality of blades arranged on the disk in a circle at unequal spaces so that a position angle θn of an n-th blade is met by an equation:

$$\theta n = \theta n 0 + \theta max \times \sin\{2\pi \times m \times (n-1)/Z\}$$

where Z is the number of the blades, θn0 is a position angle defining a position of the n-th blade when the blades the number of which is shown by Z are arranged on the disk at equal spaces where $1 \leq n \leq Z$, θmax is a maximum allowable angular difference, and m is a degree of a rotational frequency and takes any integer from 1 to Z−1.

16 Claims, 11 Drawing Sheets

| n | θn (DEGREE) WHEN θmax=10 AND m=3 | θn (DEGREE) WHEN θmax=10 AND m=2 | θn (DEGREE) WHEN BLADES ARE ARRANGED AT EQUAL INTERVALS |
|---|---|---|---|
| 1 | 0 | 0 | 0 |
| 2 | 66 | 78 | 72 |
| 3 | 153.5 | 134.5 | 144 |
| 4 | 206.5 | 225.5 | 216 |
| 5 | 294 | 282 | 288 |

IMPELLER FOR USE IN COOLING DYNAMOELECTRIC MACHINE

BACKGROUND OF THE INVENTION

1. Field of the Invention

This invention relates to an impeller used for cooling a dynamoelectric machine such as electric motors or generators, and more particularly to an improvement in the noise reduction in such an impeller.

2. Description of the Prior Art

With an increasing concern about environmental noise, various attempts have recently been made to reduce noise in dynamoelectric machines such as electric motors or generators. Particularly in a dynamoelectric machine provided with a cooling fan, most of noise produced in the machine results from noise produced by blades of an impeller of the fan. Accordingly, many attempts have been made to reduce the noise produced by the blades of the impeller.

Generally speaking, the noise produced with rotation of an impeller is distributed in a wide frequency range. When a plurality of blades are arranged radially on a disk at equal spaces, a noise with a predetermined frequency and an extraordinary high sound pressure level is produced. This noise is a periodic noise having a fundamental frequency f (Hz) obtained by multiplying the number of blades by a rotational frequency (Hz), namely, a noise with a frequency represented by 1×f, 2×f, 3×f, ... This noise is referred to as "simple tone." A noise having the simple tone as a component is generally hard to hear and offensive to the ear.

Figure 15A:
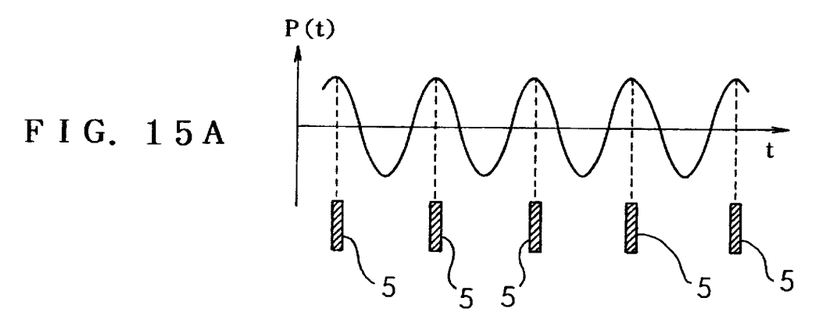
FIGS. 15A and 15B are graphs showing sound pressures of the periodic noise produced in radial fans in which the blades are arranged at equal and unequal spaces respectively.
Figure 16:
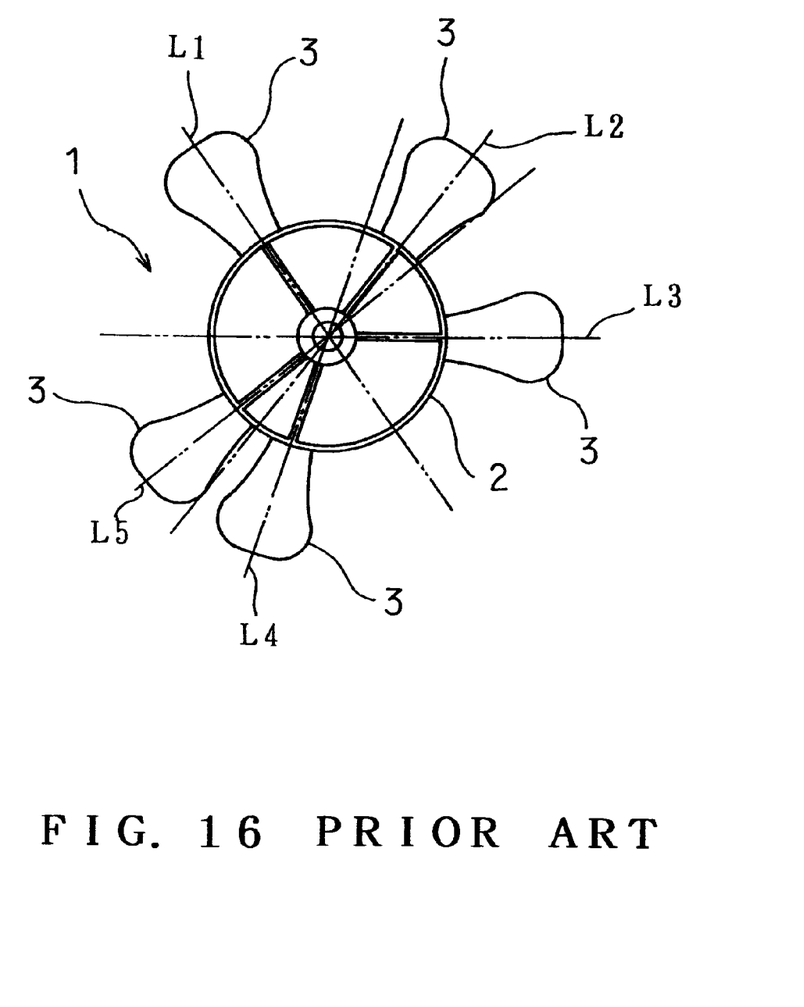
FIG. 16 is a front view of a conventional impeller of an axial flow fan.

To reduce the above-described periodic noise, Japanese Patent Publication No. 55-25555A proposes an impeller comprising a plurality of blades arranged at unequal spaces. In the proposed impeller, however, due consideration is not given to a mechanical balance. More specifically, FIG. 15 shows an impeller 1 for a propeller type axial flow fan disclosed in the above-referenced gazette. The impeller 1 comprises a disk 2 and five blades 3 arranged on an outer circumference of the disk 2 in a circle or radially. In FIG. 5, reference symbols L1 to L5 denote axes passing through the centers of gravity of the respective blades 3 and the center of rotation. As obvious from FIG. 15, the impeller 1 is symmetrical about each of the axes L1 and L2, whereas the impeller 1 is unsymmetrical about each of the axes L3 to L5. Further, angles between the blades 3 vary to a large degree, and a maximum angular difference is 66.9 degrees.

When the symmetry of the impeller 1 is collapsed to a large degree, centrifugal forces applied to the respective blades 3 during rotation of the impeller become unbalanced, whereupon there is a possibility of occurrence of vibration. Further, flows of cooling air supplied by the impeller are disturbed when the angular differences between the blades 3 become large. As a result, noise due to a turbulent flow of air is increased. Further, an amount of cooling air supplied by the impeller is reduced and accordingly, the cooling performance of the fan is reduced.

SUMMARY OF THE INVENTION

Therefore, an object of the present invention is to provide an impeller which can reduce the periodic noise without reduction in the cooling performance and can also reduce the vibration and the noise due to the turbulent flow of air.

Figure 14A:
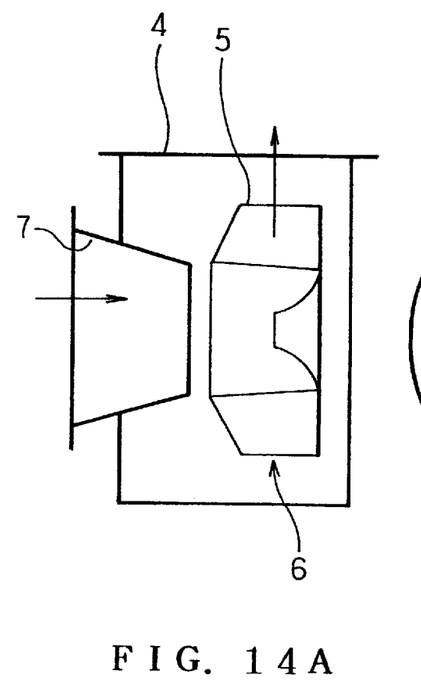
FIGS. 14A and 14B are side and front views of a radial fan, explaining the mechanism for production of the periodic noise respectively.
Figure 14B:
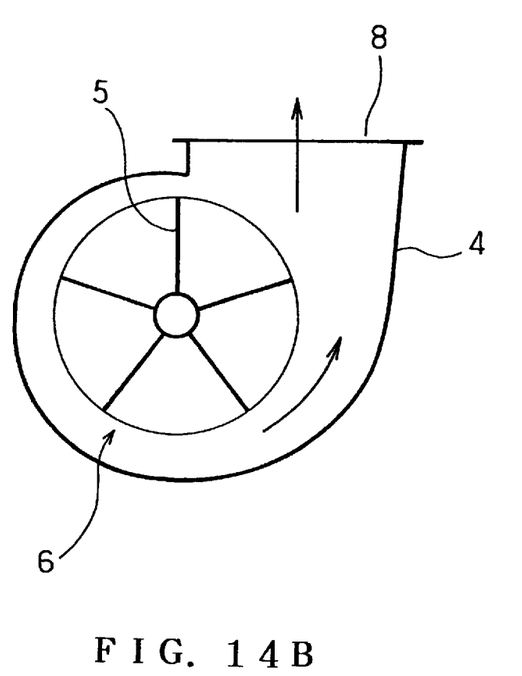

It is known in the art that the periodic noise due to operation of the blades is produced with rotation of the impeller in blowers or fans. A mechanism for production of the periodic noise will be described with reference to FIGS. 13A and 13B both showing a radial fan. The radial fan comprises a fan casing 4 and an impeller 6 having five blades 5. Upon rotation of the impeller 6, outside air flows through an inlet 7 into the fan casing 4 with the passing of each blade 5. In this case, the air is contracted when flowing into the inlet 7, whereas the air is expanded when flowing through the inlet 7 into the fan casing 4. The contraction and expansion of the air are repeated at intervals of a time between the passing of one blade 5 and the passing of the subsequent blade 5. The aforesaid periodic noise is considered to be produced by the repeated contraction and expansion of the air. The air contraction and expansion are also repeated when the air in the fan casing 4 is exhausted outside through an outlet 8.

Consider now only variations in air pressure at the compression side. When the five blades 5 are arranged on the disk at equal spaces, a sound pressure P(t) observed at any observation point is sinusoidal as shown in FIG. 14A. In a case where the air pressure, namely, the sound pressure becomes maximum when the blade passes any observation point, the sound pressure P(t) is shown by the following equation (1):

$$P(t)=\sin(\omega_z \cdot t) \qquad (1)$$

where $\omega_z = 2\pi \times f \times z$, f is a rotational frequency of the impeller in Hz, z is the number of blades, and the amplitude is 1 for convenience.

Figure 15B:
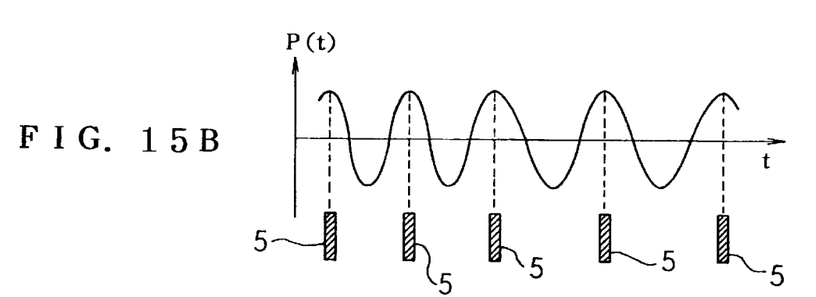

On the other hand, when the blades 5 are arranged on the disk at unequal spaces, a sound pressure P(t) observed at any observation point is shown in FIG. 14B. More specifically, the location where the sound pressure P(t) becomes the maximum varies according to a space between the blades 5. Accordingly, a spectrum of the original periodic noise is diffused to various frequencies such that a peak level is reduced. The inventors then applied a periodic frequency modulation to the sinusoidal wave of the periodic noise to employ a method of diffusing the periodic noise spectrum to various frequencies.

When the symbol $\omega_m$ represents a modulating angular frequency, an approximate sound pressure P(t) after the modulation is shown by the following equation (2):

$$P(t)=\sin\{\omega_z \times t + \beta \times \sin(\omega_m \times t)\} \qquad (2)$$

where $\beta$ is an amplitude indicative of the degree of modulation and $\omega_m = m \times 2\pi \times f$ where m is an integer.

A position angle of each blade is set so that each blade is located at a position where the maximum of P(t) is obtained on the basis of the above equation (2). Although the position angle of each blade is strictly obtained from equation (2), an approximate value thereof may be obtained in the following manner. That is, in an impeller comprising a plurality of blades arranged on the disk in a circle at unequal spaces, a position angle θn of an n-th blade is met by the following equation (3):

$$\theta n = \theta n 0 + \theta max \times \sin\{2\pi \times m \times (n-1)/Z\} \qquad (3)$$

where Z is the number of the blades, θn0 is a position angle defining a position of the n-th blade when the blades the number of which is shown by Z are arranged on the disk at equal spaces where $1 \leq n \leq Z$, θmax is a maximum allowable angular difference, and m is a degree of a rotational frequency and takes any integer from 1 to Z−1. The present invention provides an impeller comprising a plurality of blades arranged on the disk in a circle at unequal spaces so that the position angle of each blade is obtained from the above equation (3).

According to the above-described arrangement, a plurality of blades are arranged on the disk so that the spaces between the blades are rendered unequal. Consequently, the periodic noise can be reduced. Further, when the location of one of the blades varies by a predetermined angle in one direction relative to a location when the blades are arranged on the disk at equal spaces, the location of another blade is set to vary by the predetermined angle in the other direction. Thus, since the position angles of the blades vary so as to be mutually compensated, the balance of the impeller can be kept.

A large vibration occurs when centrifugal forces applied to the respective blades upon rotation of the impeller are unbalanced. This vibration is one of the causes for the noise produced with rotation of the impeller. Where as a sum of orthogonal components obtained by dividing each of centrifugal forces applied to the respective blades having the respective position angles θn, an index RB representative of balance of the centrifugal forces is defined as $$RB = \sum_{n=1}^{z} \cos\theta n,$$

the position angle θn is set so that a range represented as $-0.1 \leq RB \leq 0.1$ is met. The centrifugal forces are balanced more as the value of RB approximates to zero. Actually, however, the value of RB may be allowed if it is within the aforesaid range.

The value of RB differs depending upon the environment in which the impeller is installed. For example, when the impeller is used for a cooling fan for the dynamoelectric machine, the value of RB is preferably within a range represented as $-0.02 \leq RB \leq 0.02$.

The angular differences between the blades become larger with an increase in the maximum allowable angular difference θmax. As a result, flows of cooling air supplied by the cooling fan are disturbed, noise due to a turbulent flow of air is increased. Further, an amount of cooling air supplied by the impeller is reduced and accordingly, the fan total efficiency is reduced. In view of this, the maximum allowable angular difference θmax is preferably within 10 degrees. In this case, the number of the blades is preferably between 5 and 18.

BRIEF DESCRIPTION OF THE DRAWINGS

Other objects, features and advantage of the present invention will become clear upon understanding of the following description of the preferred embodiment, made with reference to the accompanying drawings, in which.

DETAILED DESCRIPTION OF THE PREFERRED EMBODIMENTS

Figure 1:
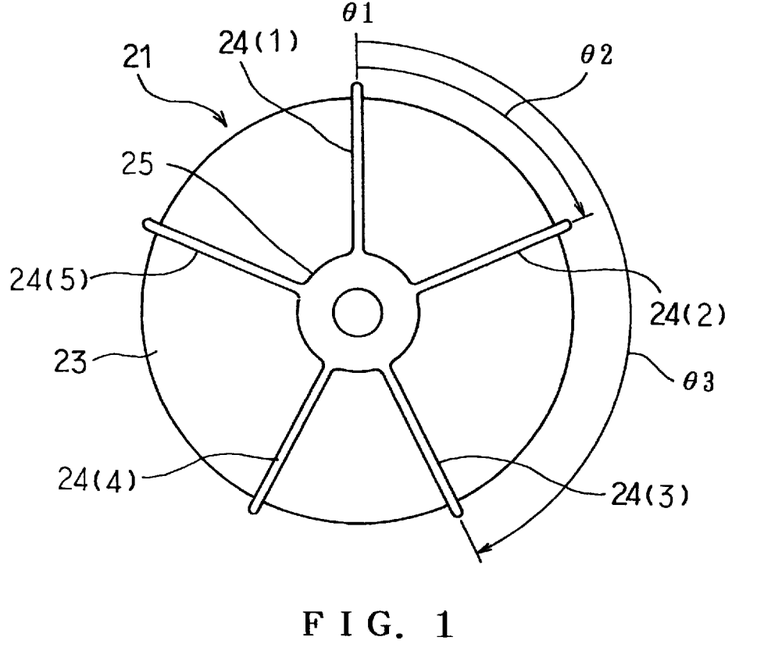
FIG. 1 is a front view of an impeller of one embodiment in accordance with the present invention.
Figure 2:
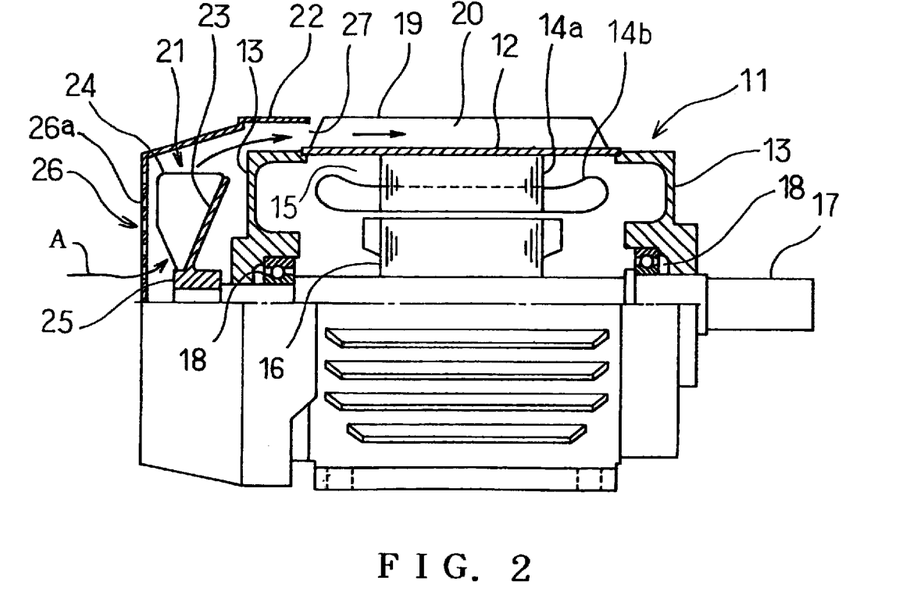
FIG. 2 is a partially sectional side view of an induction motor of the totally enclosed fan-cooled type with which the impeller of the embodiment is provided.

An embodiment of the present invention will be described with reference to FIGS. 1 to 10. In the embodiment, the invention is applied to an induction motor of the totally closed fan-cooled type. Referring first to FIG. 2, the induction motor comprises a main body 11 including a stator frame 12 and two bearing brackets 13. A stator 15 secured to an inside of the stator frame 12 includes a stator core 14a and a stator winding 14b wound on the stator core 14a. A rotor 16 is disposed inside the stator 15 with a predetermined gap therebetween. The rotor 16 has a rotational shaft 17 supported on bearings 18 further mounted on the respective bearing brackets 13. Both ends of the rotational shaft 17 extend outside the main body 11 of the induction motor. Cooling fins 19 are formed on the outside of the stator frame 12 so as to extend along an axis of the rotational shaft 17. Ventilation passages 20 are defined between each cooling fin 19 and the adjacent one.

An impeller 21 in accordance with the present invention is mounted on the left-hand end of the shaft 17 opposed to the load side end thereof as viewed in FIG. 2, so that the impeller 21 is rotated with the shaft 17. The impeller 21 constitutes a radial fan serving as a cooling fan. A fan cover 22 is screwed to the left-hand bearing bracket 13 so as to cover the impeller 21. The impeller 21 is made of polyamide, for example and comprises a disk 23 and five blades 24 arranged on the disk 23 in a circle or radially, as shown in FIGS. 1 and 2. The blades 24 are arranged on the disk 23 at unequal spaces as will be described in detail later. The disk 23 is generally formed into the shape of a funnel and inclined inward or rightward as viewed in FIG. 2. The disk 23 has an integrally formed central boss 25 fitted with the left-hand end of the shaft 17. The fan cover 22 has an air inlet 26 formed in a left end wall thereof. The air inlet 26 comprises a large number of through holes 26a. Upon rotation of the impeller 21 with the rotational shaft 17, outside air is drawn in through the air inlet 26 as shown by arrow A in FIG. 2. The drawn air is supplied by the blades 24 through an outlet 27 and ventilation passages 20, thereby cooling the main body 11 of the induction motor.

Position angles determining positions of the respective blades 24 of the impeller 21 are set in the following manner. The blade 24 located uppermost in FIG. 1 is referred to as a first blade. The clockwise next one is referred to as a second blade and the further clockwise next one is referred to as a third blade, and so on. A position angle θn of an n-th blade refers to an angle made by a straight line between the center of gravity and the center of rotation of the first blade 24 and a straight line between the center of gravity and the center of rotation of the n-th blade where n is an integer from 1 to 5. First, the position angle θn of the n-th blade is set so as to meet the aforesaid equation (3):

$$\theta n = \theta n0 + \theta max \times \sin\{2\pi \times m \times (n-1)/5\} \quad (3)$$

where m is a degree of the rotational frequency and any integer from 1 to 4. Further, when centrifugal forces applied to the respective blades are unbalanced, the resultant mechanical unbalance causes vibration. This vibration is one of the causes of the noise produced by the impeller. Where an index RB representative of balance of centrifugal forces applied to the respective blades 24 is defined as:

$$RB = \sum_{n=1}^{z} \cos\theta n, \quad (4)$$

the centrifugal forces are balanced more as the value of RB approximates to zero. In the embodiment, the position angle θn of each blade 24 is set so that the following range of the value of RB is met:

$$-0.02 \leq RB \leq 0.02. \quad (5)$$

Figure 3:
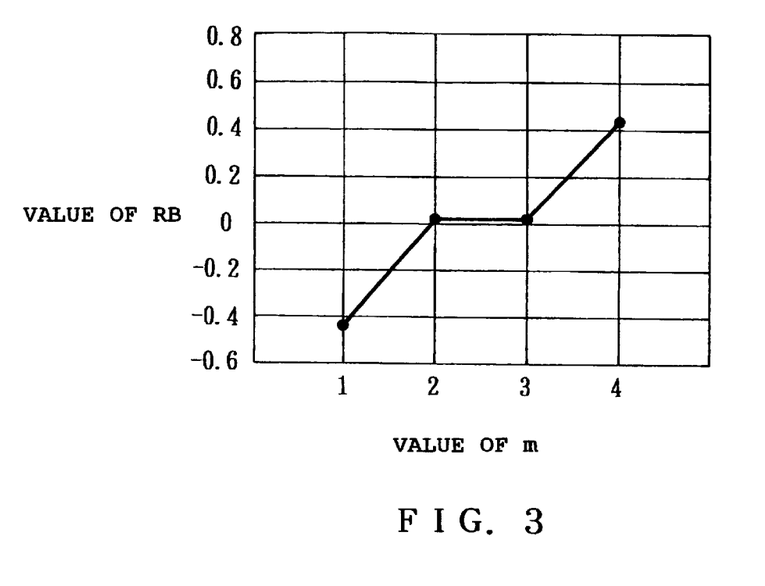
FIG. 3 is a graph showing the relation between the value of RB and the value of m.

FIG. 3 shows the relation between the value of RB and the value of m where θmax is set at 10 degrees. As shown, the value of RB approximates to zero when m is 2 or 3 rather than when m is 1 or 4. More specifically, RB=0.018 when m=2 and RB=0.02 when m=3. The value of RB has the same tendency when θmax is set at values other than 10. Then, the embodiment employs 2 or 3 as the value of m.

Figure 4:
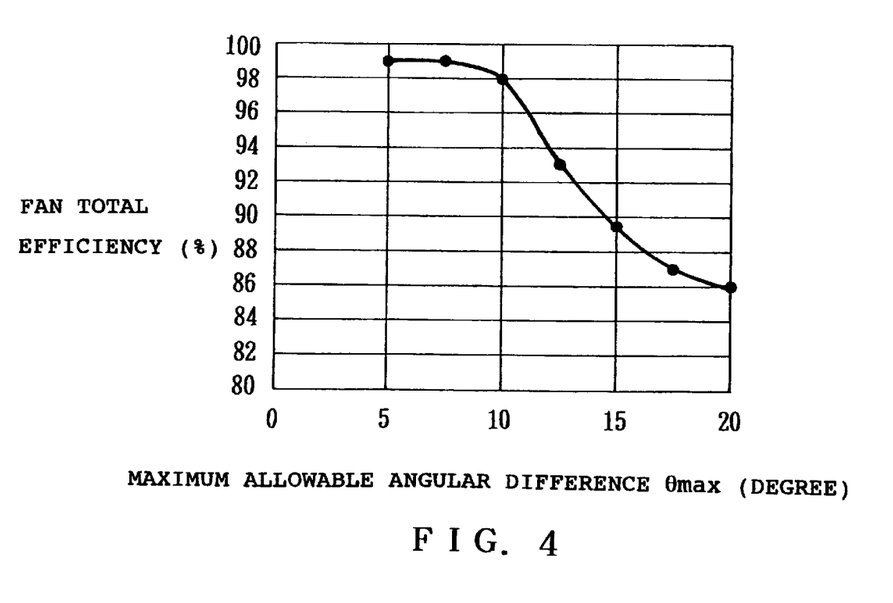
FIG. 4 is a graph showing the relation between the maximum allowable angular difference and the fan total efficiency.
Figure 5:
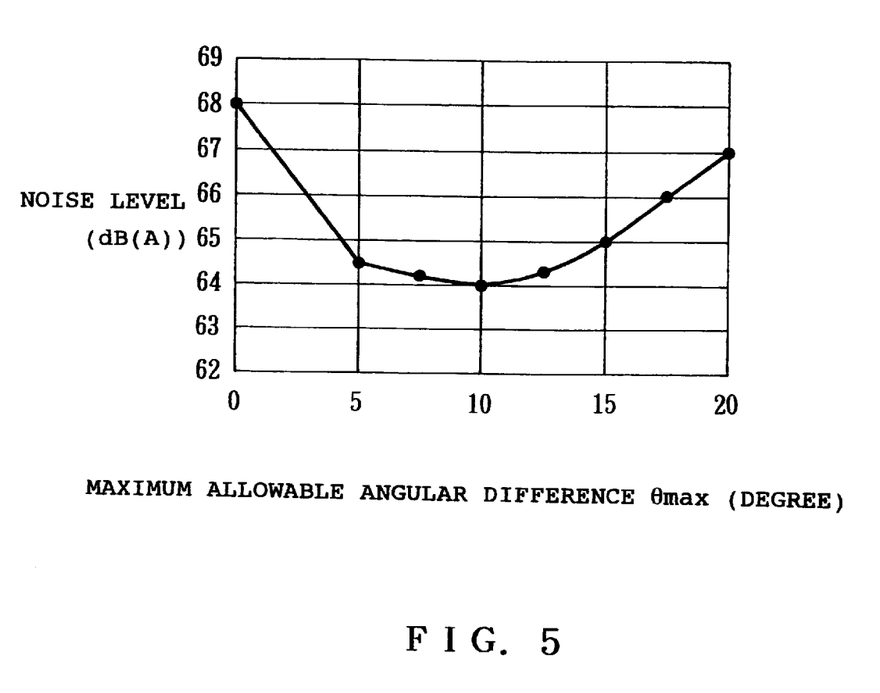
FIG. 5 is a graph showing the relation between the maximum allowable angular difference and the noise level.

A larger amount of air supplied by the impeller 21 is desired for the purpose of cooling the motor. Generally speaking, when the blades are arranged on the disk at unequal spaces, flows of cooling air supplied by the impeller are disturbed such that an amount of supplied cooling air is reduced as compared with a case where the blades are arranged on the disk at equal spaces. Further, the disturbance of the flows of cooling air causes a turbulence, resulting in an increase in the noise with the turbulence. In the embodiment, the maximum allowable angular difference θmax is set to be equal to or smaller than 10 degrees so that a reduction in the amount of supplied cooling air is restricted to a value as small as possible. This setting of the maximum allowable angular difference θmax is based on the relationship between θmax and the fan total efficiency of the blades as shown in FIG. 4 and the relationship between θmax and the noise level as shown in FIG. 5. That is, FIGS. 4 and 5 show the results of measurement of an amount of supplied cooling air and noise level with respect to an impeller made on the basis of the position angles θn of the blades obtained by setting m at 3 and the maximum allowable angular difference θmax at various values. In FIG. 4, the fan total efficiency refers to a ratio (%) to an amount of supplied cooling air of an impeller including blades arranged at equal spaces.

As obvious from FIG. 4, the fan total efficiency is maintained at or above 98% when the maximum allowable angular difference θmax is equal to or smaller than 10 degrees. The fan total efficiency is rapidly reduced when the maximum allowable angular difference θmax exceeds 10 degrees. On the other hand, the noise level in the case of the arrangement of the blades 24 at unequal spaces is reduced as compared with the noise level of 68 dB(A) in a case where the blades are arranged at equal spaces, as shown in FIG. 5. The noise level becomes the minimum when the maximum allowable angular difference θmax is set at 10 degrees.

Figure 6:
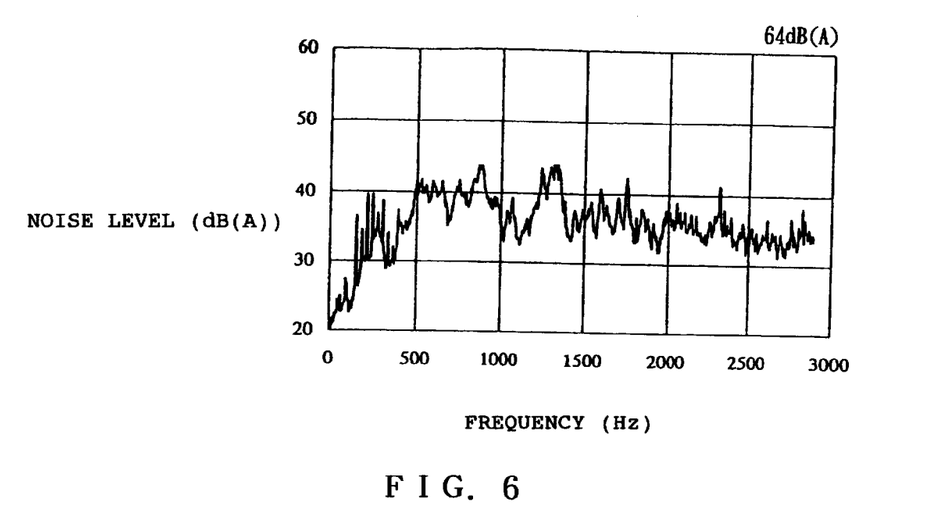
FIG. 6 is a graph showing the noise level.
Figure 7:
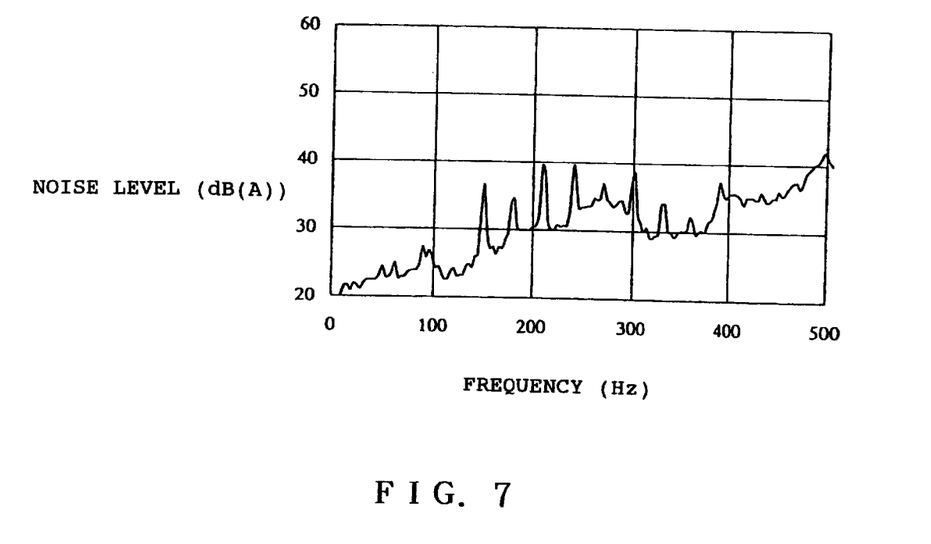
FIG. 7 is an enlarged graph showing the noise level in the frequency range of 0 to 500 Hz in the noise shown in FIG. 6.
Figure 8:
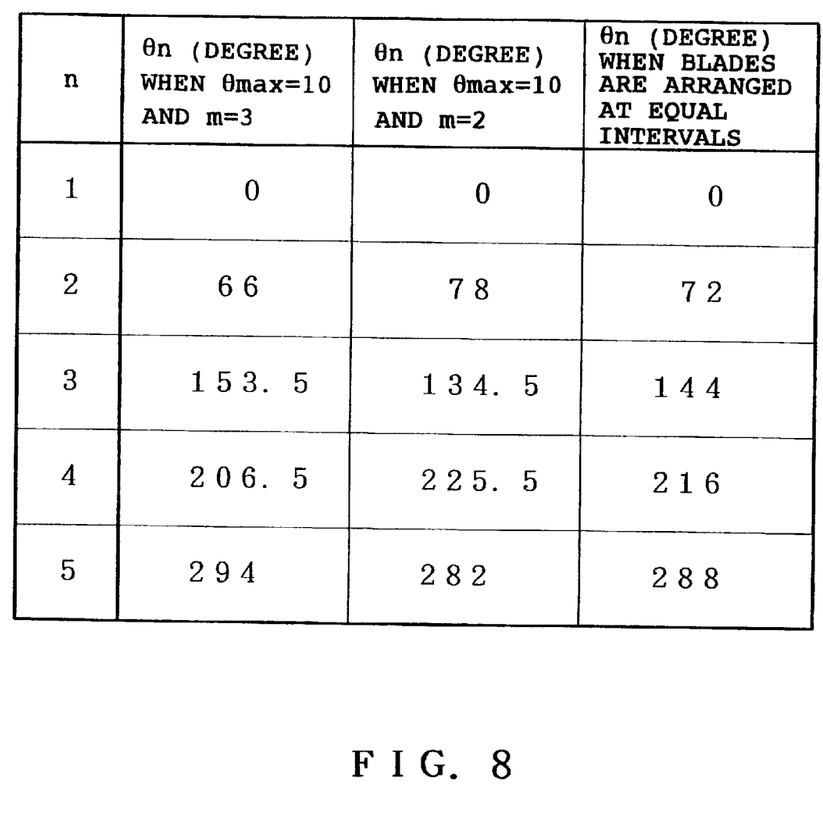
FIG. 8 is a table
Figure 9:
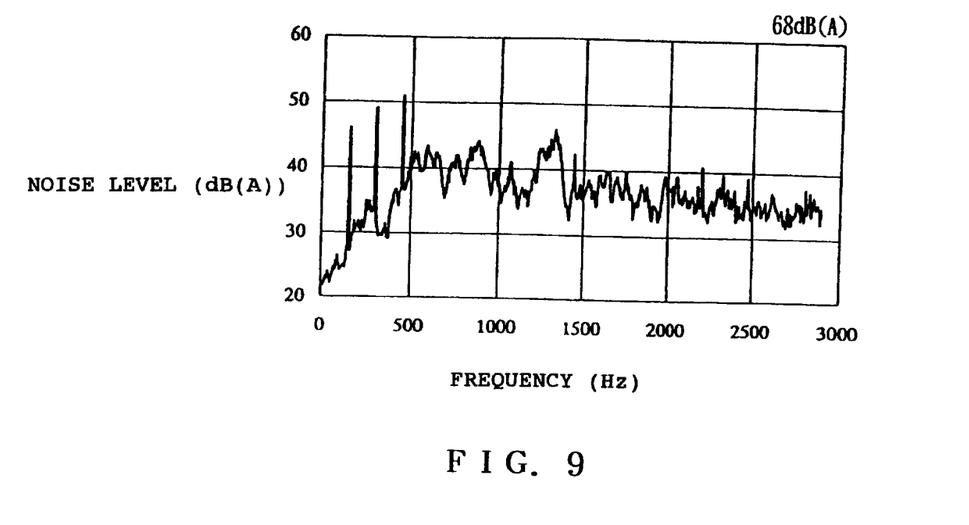
FIG. 9 is a graph showing the noise level when the blades are arranged at equal spaces.
Figure 10:
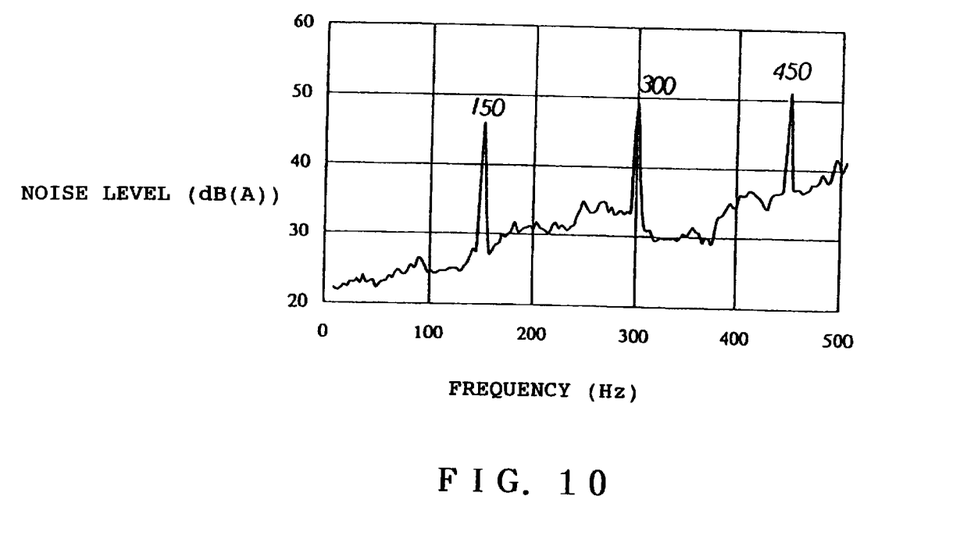
FIG. 10 is an enlarged graph showing the noise level in the frequency range of 0 to 500 Hz in the noise shown in FIG. 9.

In the manufacture of the impeller of the embodiment, θmax is set at 10 and m is set at 3, and the position angle θn of each blade 24 is obtained by calculation on the basis of the aforesaid equation (3) and range (5). FIGS. 6 and 7 show the results of frequency analysis of noise levels (dB(A)) during operation of the impeller 21 where the rotational frequency is 30 Hz, namely, the results of frequency analysis of waveforms of sounds obtained by a noise meter by means of the fast Fourier transform (FFT). FIG. 8 shows the position angle θn of each blade 24 of the impeller 21 of the embodiment in a case where the value of RB is 0.02. FIGS. 9 and 10 show the noise level (dB(A)) during the operation of an impeller having blades arranged at equal spaces. The position angle of each blade is also shown in FIG. 8. FIG. 7 shows the frequency range between 0 and 500 Hz in the overall range of FIG. 6. FIG. 10 also shows the frequency range between 0 and 500 Hz in the overall range of FIG. 9.

As shown in FIG. 10, the sound produced by the impeller in which the blades are arranged at equal spaces contains simple tone components having the frequencies of 150, 300 and 450 Hz respectively, namely, a periodic noise. As a result, the sound is hard to hear and offensive to the ear. On the other hand, the sound produced by the impeller 21 of the embodiment contains no typical simple tone and accordingly easy to hear, as shown in FIG. 7.

Further, since the noise due to turbulent flow of air is also reduced by the impeller 21 of the embodiment, the overall noise level is 64 dB(A). On the other hand, the noise level is 68 dB(A) in the case of the impeller having the blades arranged at equal spaces. Accordingly, the impeller 21 of the embodiment reduces the noise energy to one third of that in the case of the impeller having the blades arranged at equal spaces.

According to the above-described embodiment, the blades 24 are arranged on the disk 23 at the unequal spaces. Consequently, the noise due to rotation of the impeller 21 or the periodic noise can be reduced. Further, the centrifugal forces applied to the respective blades 24 are substantially equalized although the blades 24 are arranged at the unequal spaces. Consequently, since occurrence of vibration during rotation of the blades 24 is prevented, a further noise reduction can be achieved.

Further, the maximum angular difference between the blades 24 is 34.5 degrees although that in the conventional impeller 1 is 66.9 degrees. Consequently, the noise due to turbulent flow of air can be reduced and accordingly, the overall noise produced by the impeller 21 can be reduced. Moreover, since a reduction in an amount of cooling air supplied by the impeller 21 is restrained, the cooling performance can be prevented from being reduced.

The maximum allowable angular difference θmax is set at 10 degrees and the rotational frequency degree m is set at 3 in the foregoing embodiment. However, θmax may be set at 10 degrees and m may be set at 2. The result of an experiment carried out by the inventors shows that substantially the same effect as described above can be achieved in a case where θmax is set at 10 degrees and m is set at 3. FIG. 8 shows the position angles of the respective blades 24 in this case and RB is 0.02.

Figure 11:
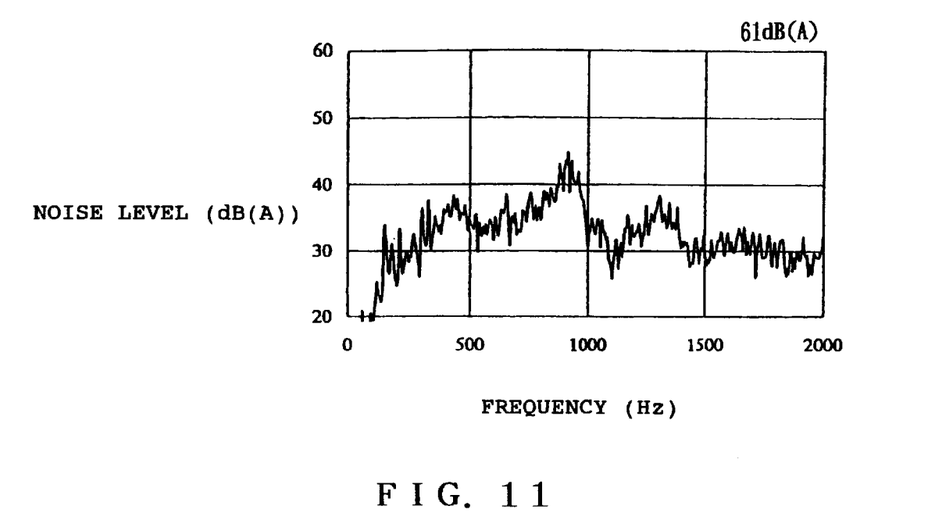
FIG. 11 is a graph showing the noise level when the blades are arranged on an axial flow fan in which the blades are arranged at unequal spaces according to another embodiment of the invention.
Figure 12:
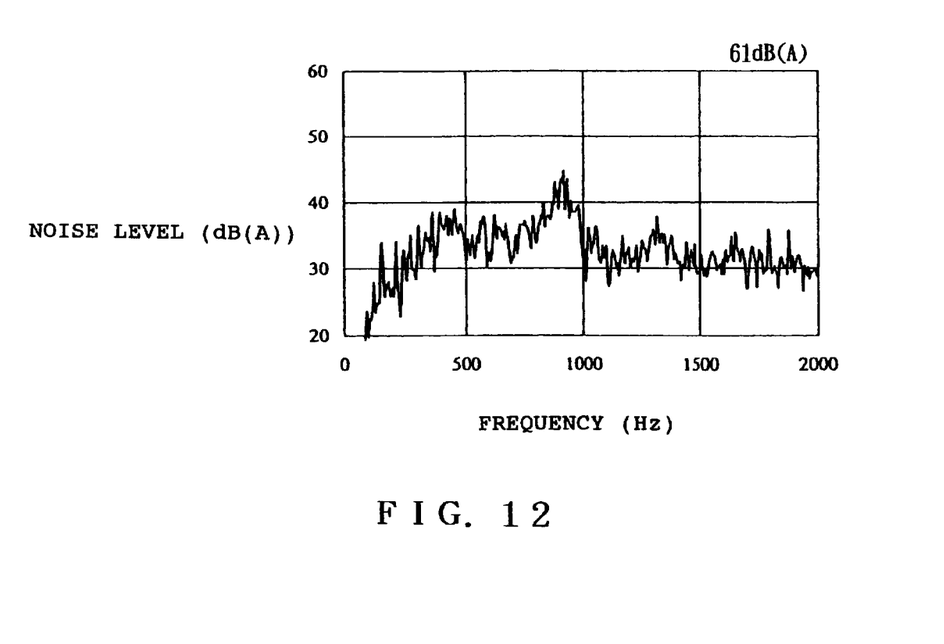
FIG. 12 is a graph showing the noise level when the blades are arranged at unequal spaces.
Figure 13:
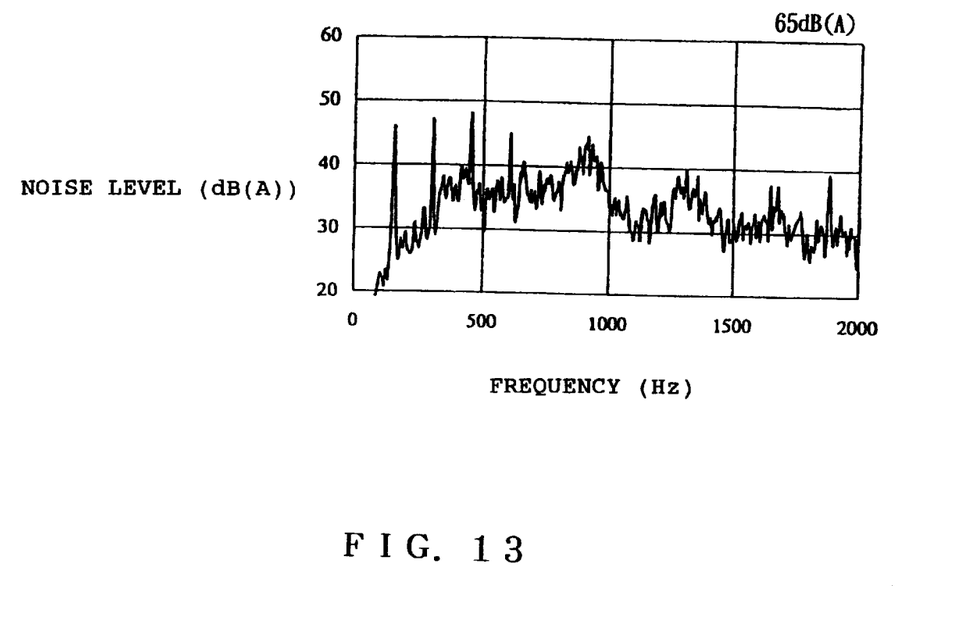
FIG. 13 is a graph showing the noise level when the blades are arranged at equal spaces in an axial flow fan.

Although the invention is applied to the impeller 21 of the radial fan in the foregoing embodiment, the invention may be applied to an axial fan as exemplified in the description of the prior art with reference to FIG. 16. More specifically, θmax is set at 10 degrees and m is set at 2 in an axial fan having five blades (Z=5). A position angle θn of each blade is obtained by calculation on these conditions. FIG. 11 shows a noise level (dB(A)) in the manufactured axial fan. FIG. 8 shows the position angles of the respective blades. FIG. 12 shows a noise level in another axial fan wherein θmax is set at 10 and m is set at 3. FIG. 13 shows a noise level (dB(A)) in further another axial fan wherein blades are arranged at equal spaces. In this case, the position angles θn of the respective blades are the same as those of the radial fan shown in FIG. 8.

As obvious from FIGS. 11 to 13, the typical simple tone or the periodic noise can also be reduced when the blades are arranged at equal spaces in the axial fan so that the aforesaid equation (3) and range (5) are met. Consequently, the overall noise level can be reduced.

The invention may be applied to an impeller of a cooling fan for generators. Further, the invention may be applied to impellers for overall blowers and fans including mixed flow fans and cross flow fans other than the radial fans and the axial fans.

Only one requirement for the value of RB is the range, $-0.1 \leq RB \leq 0.1$. More specifically, occurrence of vibration in the dynamoelectric machine such as electric motors increases an amount of produced noise and adversely affects the performance of the machine incorporated with the dynamoelectric machine. Accordingly, it is desired that the value of RB should be approximated to zero. In view of this, the requirement for the value of RB is the range, $-0.02 \leq RB \leq 0.02$, in the embodiment. On the other hand, in ventilating fans and electric fans, the requirement for the value of RB is the range, $-0.1 \leq RB \leq 0.1$.

The impeller may be made of another plastic material other than polyamide. Further, the impeller may be made by casting an aluminum alloy or by welding a sheet metal. Additionally, the equation for finding the position angle θn of each blade may be represented as:

$$\theta n = \theta n0 + \theta max \times \cos \{2\pi \times m \times (n-1)/Z\}. \quad (6)$$

The number of blades 24 may be three, four, five or more. However, when the number of blades is equal to or smaller than four, it is difficult to obtain a mechanical balance of the blades arranged at unequal spaces. When the number of blades is equal to or larger than nineteen, an equal angle portion of the angle between the blades is below 20 degrees. In this case, the blades are arranged with the angular difference of ±10 since the optimum allowable angular difference is equal to or smaller than 10 degrees. As a result, the spaces between the blades become small so that the fan total efficiency is reduced. This requires special techniques for designing and making the impeller. Consequently, for the purpose of easily designing and making the impeller, the number of blades is preferably set between five and eighteen.

In a case where the number of blades is six, the position angles θn of the respective blades are preferably set as follows: θ1=0, θ2=68.5, θ3=111.5, θ4=180, θ5=248.5, and θ6=291.

In a case where the number of blades is seven, the position angles θn of the respective blades are preferably set as follows: θ1=0, θ2=48, θ3=109, θ4=146, θ5=213.5, θ6=261.5, and θ7=299.

In a case where the number of blades is eight, the position angles θn of the respective blades are preferably set as follows: θ1=0, θ2=55, θ3=90, θ4=125, θ5=180, θ6=235, θ7=270, and θ8=305.

In a case where the number of blades is nine, the position angles θn of the respective blades are preferably set as follows: θ1=0, θ2=50, θ3=83.5, θ4=111.5, θ5=153.5, θ6=206.5, θ7=248.5, θ8=276, and θ9=310. Alternatively, the position angles may be set as follows in the case of the nine blades: θ1=0,θ2=43,θ3=73.5, θ4=128.5, θ5=150, θ6=206.5, θ7=248, θ8=276.5, and θ9=310. Furthermore, the position angles may be set as follows in the case of the nine blades: θ1=0, θ2=31, θ3=88.5, θ4=120, θ5=151, θ6=206.5, θ7=248, θ8=276.5, and θ9=310.

The foregoing description and drawings are merely illustrative of the principles of the present invention and are not to be construed in a limiting sense. Various changes and modifications will become apparent to those of the ordinary skill in the art. All such changes and modifications are seen to fall within the scope of the invention as defined by the appended claims.

We claim:

1. An impeller comprising a disk and a plurality of blades arranged on the disk in a circle at unequal spaces so that a position angle θn of an n-th blade is met by an equation:

$$\theta n = \theta n0 + \theta max \times \sin \{2\pi \times m \times (n-1)/Z\}$$

where Z is the number of the blades, θn0 is a position angle defining a position of the n-th blade when the blades the number of which is shown by Z are arranged on the disk at equal spaces where $1 \leq n \leq Z$, θmax is a maximum allowable angular difference, and m is a degree of a rotational frequency and takes any integer from 1 to Z-1.

2. The impeller according to claim 1, wherein where as a sum of orthogonal components obtained by dividing each of centrifugal forces applied to the respective blades having the respective position angles θn, an index RB representative of balance of the centrifugal forces is defined as $$RB = \sum_{n=1}^{z} \cos\theta n,$$

the position angle θn is set so that a range represented as $-0.1 \leq RB \leq 0.1$ is met.

3. The impeller according to claim 1, wherein the maximum allowable angular difference θmax is equal to or smaller than 10 degrees.

4. The impeller according to claim 2, wherein the maximum allowable angular difference θmax is equal to or smaller than 10 degrees.

5. The impeller according to claim 1, wherein the number of the blades is between 5 and 18.

6. The impeller according to claim 2, wherein the number of the blades is between 5 and 18.

7. The impeller according to claim 3, wherein the number of the blades is between 5 and 18.

8. The impeller according to claim 4, wherein the number of the blades is between 5 and 18.

9. A dynamoelectric machine comprising:
a main body including a stator and a rotor rotated by a magnetic field developed by the stator; and
a cooling fan provided for cooling the main body and comprising an impeller further including a disk and a plurality of blades arranged on the disk in a circle at unequal spaces so that a position angle θn of an n-th blade is met by an equation:

$$\theta n = \theta n0 + \theta max \times \sin \{2\pi \times m \times (n-1)/Z\}$$

where Z is the number of the blades, $\theta n0$ is a position angle defining a position of the n-th blade when the blades the number of which is shown by Z are arranged on the disk at equal spaces where $1 \leq n \leq Z$, $\theta max$ is a maximum allowable angular difference, and m is a degree of a rotational frequency and takes any integer from 1 to Z−1.

10. The dynamoelectric machine according to claim 9, wherein where as a sum of orthogonal components obtained by dividing each of centrifugal forces applied to the respective blades having the respective position angles $\theta n$, an index RB representative of balance of the centrifugal forces is defined as $$RB = \sum_{n=1}^{Z} \cos\theta n,$$

the position angle $\theta n$ is set so that a range represented as $-0.1 \leq RB \leq 50.1$ is met.

11. The dynamoelectric machine according to claim 9, wherein the maximum allowable angular difference $\theta max$ is equal to or smaller than 10 degrees.

12. The impeller according to claim 10, wherein the maximum allowable angular difference $\theta max$ is equal to or smaller than 10 degrees.

13. The dynamoelectric machine according to claim 9, wherein the number of the blades is between 5 and 18.

14. The dynamoelectric machine according to claim 10, wherein the number of the blades is between 5 and 18.

15. The dynamoelectric machine according to claim 11, wherein the number of the blades is between 5 and 18.

16. The dynamoelectric machine according to claim 12, wherein the number of the blades is between 5 and 18.

* * * * *